United States Patent [19]
McMickle

[11] 3,743,207
[45] July 3, 1973

[54] SPINNING REEL WITH CONTROLLABLY ROTATABLE BAIL

[76] Inventor: Robert L. McMickle, 3628 Cliffsite Drive, Palo Verde Penninsula, Calif. 90274

[22] Filed: Dec. 15, 1971

[21] Appl. No.: 208,177

[52] U.S. Cl. .................... 242/84.21 A, 242/84.51 A
[51] Int. Cl. ............................................. A01k 89/00
[58] Field of Search .............. 242/84.21 A, 84.21 R, 242/84.2 A, 84.2 G, 84.51 A

[56] References Cited
UNITED STATES PATENTS

| 3,093,340 | 6/1963 | Mauborgne | 242/84.21 A |
| 3,141,629 | 7/1964 | Rouanet | 242/84.21 R |
| 3,351,301 | 11/1967 | Bretton | 242/84.21 R |
| 3,095,158 | 6/1963 | Louison | 242/84.21 A |

*Primary Examiner*—Billy S. Taylor
*Attorney*—Orrin M. Haugen

[57] ABSTRACT

A spinning reel structure of the open-face type which includes means for automatically changing the operational mode from line retrieval mode to line dispensing mode, and vice versa. The spinning reel structure includes frame means, a line bail for controlling the line, with a centrally disposed spindle shaft mounted on the frame, the spindle shaft having means for retaining and supporting a line spool along the outer end portion thereof. In use, a line spool is mounted on the spindle shaft, and means are provided for actuating the reel, including the line bail, to retrieve the line onto the line spool. The spinning reel structure further includes a spool cap mounted for rotation upon the frame, the spool cap having a shroud portion which is normally disposed radially outwardly of the spindle shaft, and which at least partially encloses the line spool mounted upon the spindle shaft. Drive means are provided for rotating the spool cap and for simultaneously reciprocatorily moving the spindle shaft along the axis of the spool cap, with the line bail means being operatively coupled to the spool cap. For accomplishing changeover of operational modes, the bail includes hinge means for controllably moving the bail from a stable line retrieving disposition to a stable line dispensing disposition, with over center biasing means being provided to retain the line bail in one or the other of its stable dispositions. Means are provided for controllably retracting the spindle shaft and line spool inwardly beyond the normal inner winding disposition in order to engage a bail actuating linkage. The line bail further is arranged to be held at an intermediate point between the two operational modes, and while at the intermediate point, the bail interferes with the dispensing of the line and hence functions as a line gripper. A lever or other linkage means is provided for retracting the spindle shaft and line spool, to thereby engage the line bail actuating mechanism, the arrangement being such that upon retraction of the line spool with the lever, the bail is automatically moved from line retrieving disposition to line dispensing disposition. While in either operational mode, actuation of the lever controllably moves the bail to an intermediate line gripping disposition for controlling line dispensing. The bail is automatically returned to line retrieving disposition upon rotation of the spool cap.

14 Claims, 15 Drawing Figures

Patented July 3, 1973
3,743,207
2 Sheets-Sheet 1
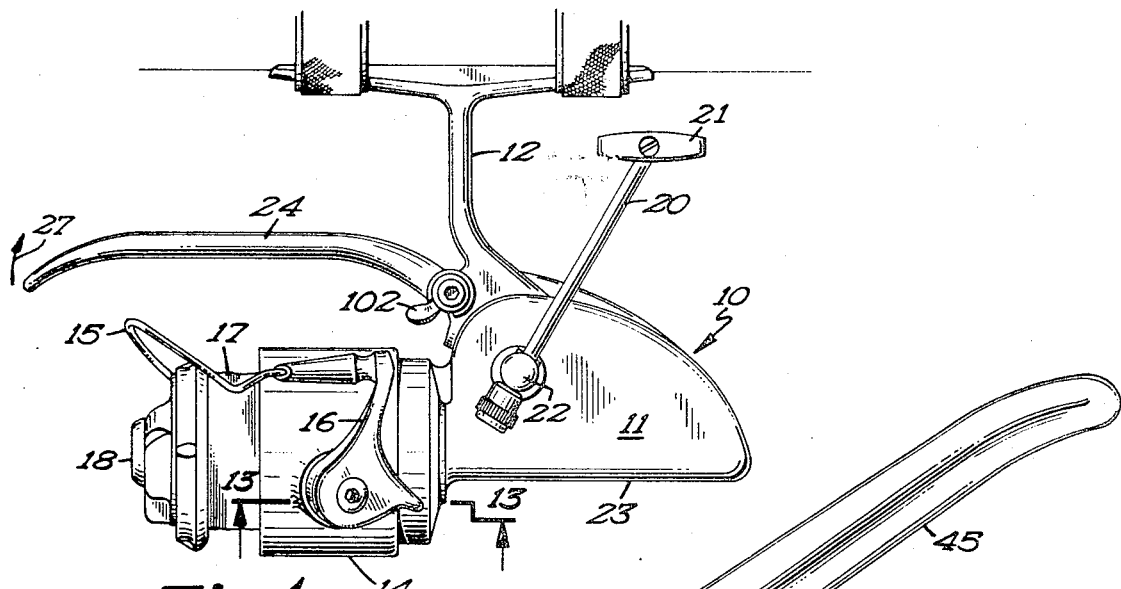
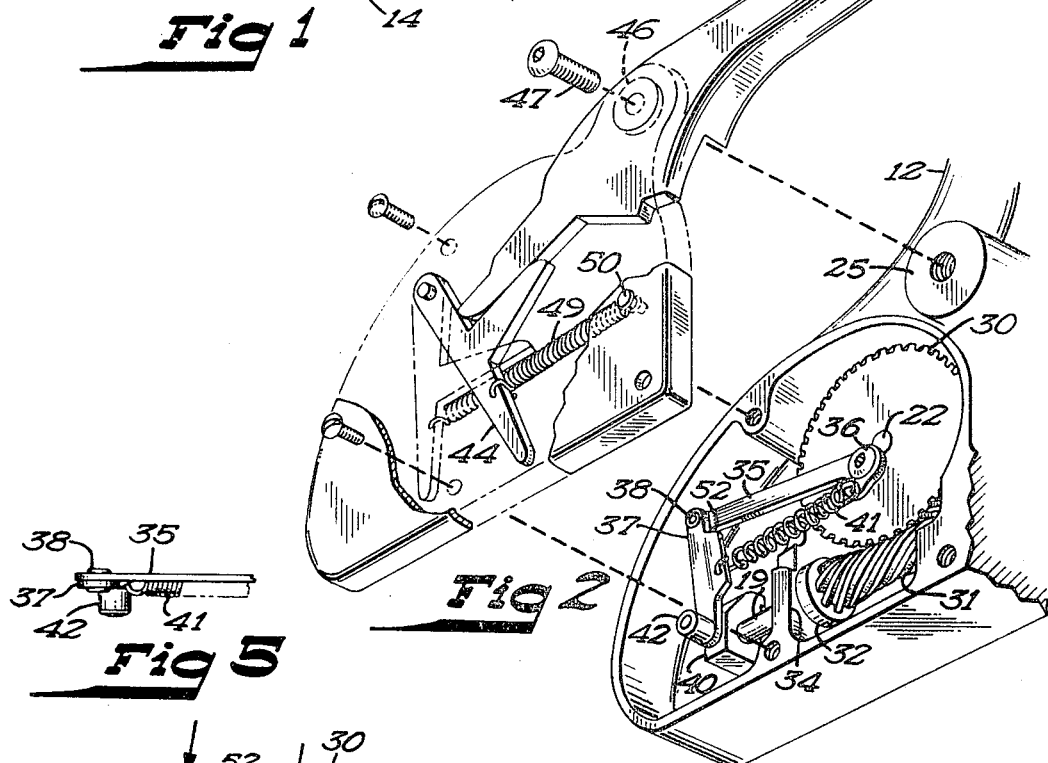
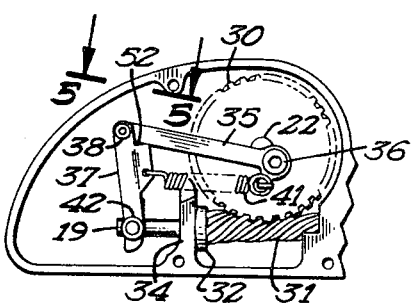
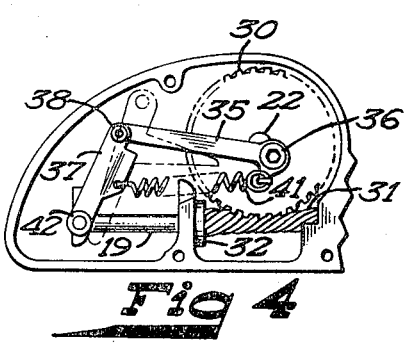

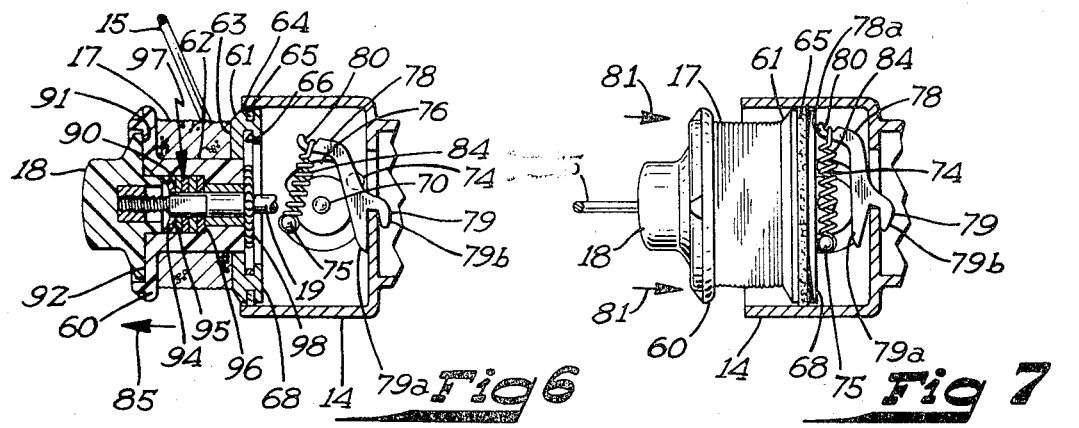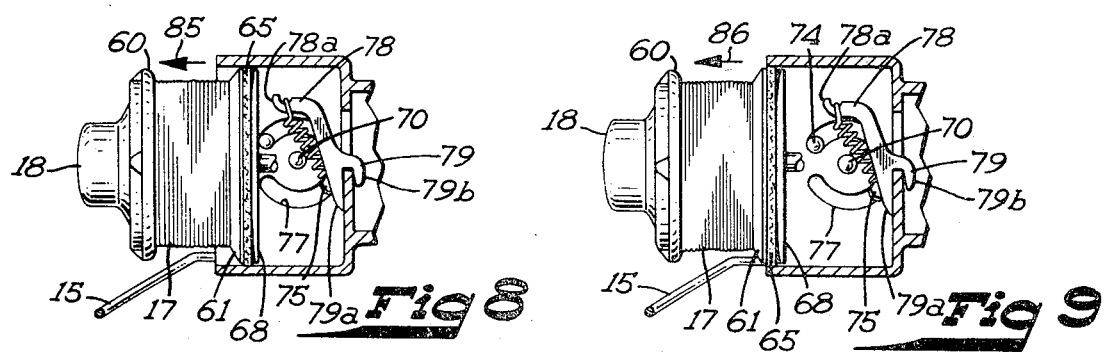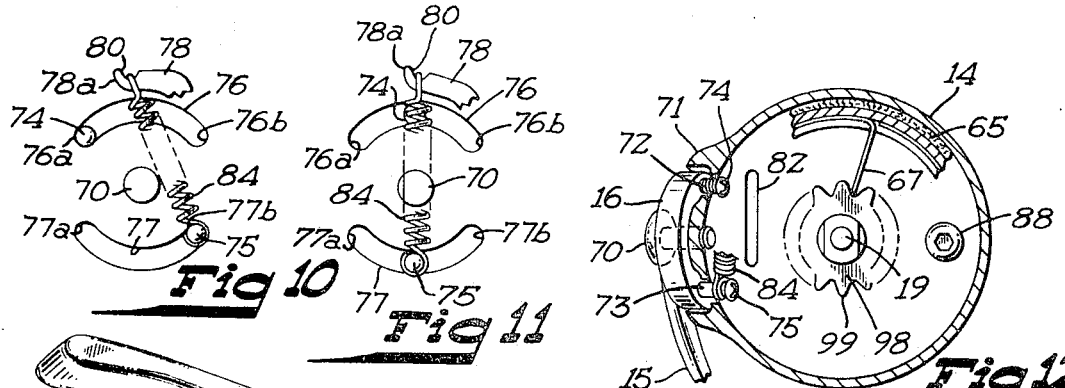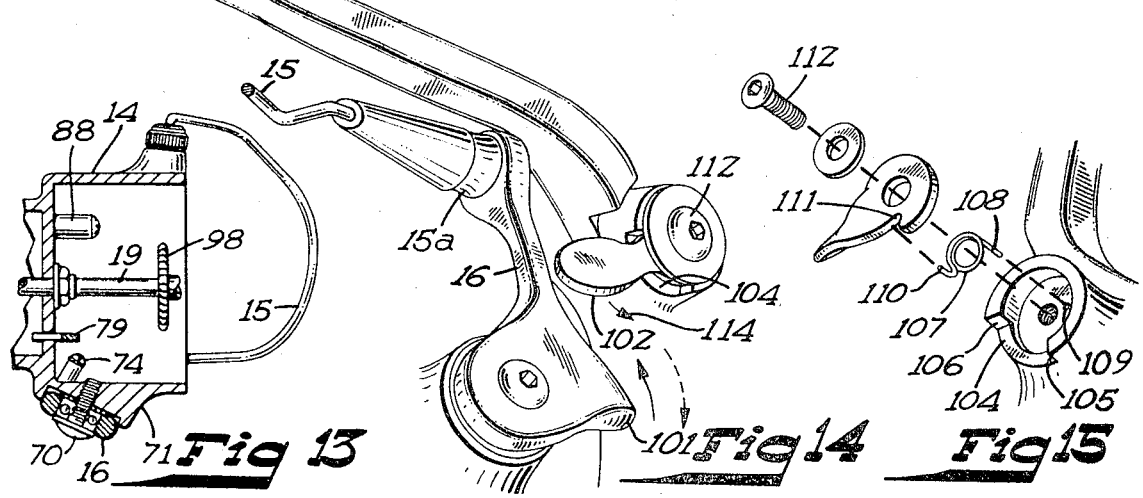

3,743,207

SPINNING REEL WITH CONTROLLABLY ROTATABLE BAIL

CROSS-REFERENCE TO RELATED APPLICATIONS

The present application is an improvement of my copending application, Ser. No. 150,630, filed June 7, 1971, entitled "SPINNING REEL WITH AUTOMATIC CHANGE-OVER OF OPERATION MODE," which application is a continuation-in-part of application Ser. No. 833,561, filed June 16, 1969, entitled "SPINNING REEL WITH AUTOMATIC CHANGE-OVER OF OPERATION MODE," now abandoned.

BACKGROUND OF THE INVENTION

The present invention relates to fishing reel structures, particularly spinning reel structures of the open-face type. More specifically, the present invention relates to an improved spinning reel structure having lever actuated means for simply, conveniently and reliably changing the disposition of the line bail means, so as to convert the operational mode from a line retrieval to line dispensing or casting, or to controllably dispose the bail in a line gripping or control mode. In addition, means are provided for simply and reliably returning the operational mode from line dispensing to line retrieval.

Presently, spinning reels, including open-face spinning reels are in wide use in sport fishing, including sport fishing on both fresh and salt water. Open-face spinning reels normally employ a spool cap assembly which carries a line bail, with the spool cap assembly being adapted for axial rotation about a spindle shaft which carries a line spool thereon. The rotation of the spool cap is normally coaxial with the spindle and spool. The spindle shaft and line receiving spool of such a reel is frequently adapted for reciprocatory to-and-fro motion within the structure, while at the same time being generally resistant to free axial rotation. Drag means are normally employed to provide controlled or resistive axial rotation. Accordingly, the line receiving spool may take up the line on a level winding or filling basis, while resisting outward dispensing of the line unless the backward pull or resistance on the line exceeds a certain maximum established by the frictional forces of the drag mechanism. Spinning reels, particularly open-face spinning reels are, of course, commercially available and well known in the prior art.

As has been indicated, spinning reels of the open-face type normally employ a spool cap which incorporates a line bail and guide assembly. The bail is secured to a bail hinge, and is normally rockable between a stable open or line dispensing (casting) mode, and a stable closed or line retrieval mode, with the user periodically manually changing these modes in the course of his fishing activity. For example, in the line dispensing mode, the bail is retracted so as to free the line for pay-out from the line receiving spool in response to the whipping or casting motion imparted to the lure secured to the end of the line. In the line retrieval mode, the bail is disposed in a position so as to capture the line whereby rotation of the spool cap accomplishes winding of the line onto the core of the line receiving spool.

In a normal cast, the line retained upon the line receiving spool rays out from the spool in response to the whipping action of the rod upon the lure secured to the end of the line, with the spooled line unwinding in response to this motion. Initiation of a cast requires gripping of the line during whipping of the rod, this being followed by a controlled rate of pay-out of the line in order to limit an over-cast, or otherwise control the range of the cast. With presently available reels, such control is normally exercised by application of pressure with the index finger directly to the unwinding coil of line, with this mode of control normally being difficult and haphazard, and resulting in inaccurate casts. It is one feature or aspect of the structure of the present invention to provide controlled line pay-out by simple actuation of a control lever, the lever replacing the entire function of finger pressure.

In the past, certain open-face spinning reels have included triggering mechanisms whereby the line bail is automatically moved to line retrieval disposition in response to forward rotation of the hand crank upon commencement of the line retrieval operation. This function effects automatic change-over from the casting mode to the line retrieval mode of operation. The bail, in closing by toggle or snap action, captures the line and thereby threads the incoming line over a line guide member or portion of the bail. The line guide, when utilized, is normally coupled to a point adjacent one operative end of the line bail, and adapted to position the line in a preferred axial disposition relative to the line spool, so that rotation of the abil and line guide relative to the spool wraps the line onto the stationary spool.

In the spinning reels in common use today, line retrieving bails are normally manually shifted from line retrieval to line dispensing disposition, while means are normally associated with the structure to close the bail by return to line retrieving disposition. Finger pressure is normally used to controllably grip the line. While fishing in the dark, or under cold or unpleasant environmental conditions, the fisherman has found hand and finger operation and control difficult. Accordingly, the structure of the present invention provides a simple, straightforward, rugged and durable arrangement for quickly accommodating the changeover function, with single lever means being disposed in the structure, preferably immediately adjacent the frame, to actuate the linkage mechanism employed to accomplish both the change of operational modes and the line control. Regardless of the immediate bail disposition, lever actuation moves the bail to an intermediate position, and upon release of the level mechanism, the bail will move from the intermediate position to the normal line dispensing or casting position. Thus, problems encountered with hand-change-over from line retrieval to line dispensing modes are overcome with the structure of the present invention. The structure of the present invention permits the use of the structure on either right or left handed reels. Thus, the apparatus is readily adapted for use with either style of reel.

Other desirable features normally employed in spinning reels may be advantageously incorporated in reels of the present invention. For example, an adjustable drag feature may be incorporated in the reel whereby the line spool is permitted a controlled rotation on the spindle shaft with controlled or predetermined frictional drag to allow for "playing" of a fish. Drag mechanisms, including adjustable drag mechanisms are fully compatible with the structure of the present invention.

SUMMARY OF THE INVENTION

Briefly, and in accordance with the present invention, an improved spinning reel of the open-face type is provided with lever actuated means providing smooth and automatic change-over of operational modes, with the same lever means providing automatic and controllable modification of the rate of pay-out of line from the line spool. A single actuating lever is used for change-over of operational mode from the line retrieval disposition to the line dispensing disposition, along with the single conventional winding crank or handle being used for returning the bail to the line retrieving disposition.

As is conventional in the art, the spinning reel of the present invention is preferably mounted with its spindle shaft disposed along an axis arranged generally parallel to the axis of the fishing rod shaft. A gear drive arrangement is provided to convert the rotation of the line retrieval crank or handle to rotation of the spool cap. The line spool for receiving the line is mounted upon means provided along the axis of the spindle shaft, with the spindle shaft being adapted to reciprocate axially to impart desired reciprocatory motion to the spool to allow for level winding of the line upon the spool core.

In order to provide for controlled "interference" with the pay-out of the line, the bail actuating linkage is arranged to move to an intermediate position which finds the line bail making contact with the line as it pays out from the line spool. In order to enhance this motion, a segment of the line bail is provided with an area having a reversed bend which forms a bail segment providing for appropriate line interference.

The spinning reel structure of the present invention is provided with an improved linkage mechanism for controllably moving the line spool into contact with a mechanism for controlling bail disposition. This linkage mechanism includes a means for retracting the line spool to a point which is axially inwardly beyond the disposition assumed by the spool during normal winding operations. When moving toward this extreme inward axial position, engagement is achieved between the line spool and sensing pins of the bail actuating mechanism, and continued retraction of the line spool causes shifting or conversion of the line bail operational mode. Upon continuation of line spool retraction, the position sensing pins together with cooperating linkages are moved or carried to a position wherein the line bail is automatically carried or "flipped" to the line dispensing or casting position. Thereafter, simple rotation of the spool cap will return the bail hinge and the line bail to the normal line retrieval disposition.

Therefore, it is a primary object of the present invention to provide an improved spinning reel structure of the open-face type which is provided with actuating linkage means for converting the operational mode from the line retrieval mode to the line dispensing or casting mode.

It is yet a further object of the present invention to provide an improved spinning reel of the open-face type which is provided with extremely rugged and durable means for converting the operational mode of the bail from the line retrieval mode to the line dispensing or casting mode, and wherein the bail may be returned to the line retrieval mode upon rotation of the spool cap carrying the bail.

It is yet a further object of the present invention to provide an improved spinning reel articulating mechanism which accomplishes change-over of operational mode for the reel, and wherein the identical linkage may be utilized to move the line bail into an intermediate or line "interferring" disposition during casting for controlling the length of casts.

It is yet a further object of the present invention to provide an improved spinning reel structure of the open-face type which is provided with a spindle shaft along with a line spool mounted on the spindle shaft, the shaft being arranged for normal axial motion between inner and outer winding dispositions, wherein linkage means are provided to controllably retract the line spool inwardly beyond the normal inner winding disposition to a bail actuating disposition, thereby automatically accomplishing change-over of operational modes of the bail.

Other and further objects of the present invention will become apparent to those skilled in the art upon a study of the following specification, appended claims, and accompanying drawings.

BRIEF DESCRIPTION OF THE DRAWINGS

FIG. 1 is a side elevational view of an open-face spinning reel structure embodying the improvements of the present invention;

FIG. 2 is an exploded perspective view of the spindle shaft actuating linkage portion only of a spinning reel fabricated in accordance with the present invention;

FIG. 3 is a side elevational view of linkage members which may be utilized to actuate the spindle shaft of a reel fabricated in accordance with the present invention;

FIG. 4 is a view similar to FIG. 3, and illustrating the disposition of the linkage shown in FIG. 3 upon actuation of the linkage and consequent controlled retraction of the spindle shaft;

FIG. 5 is a detail sectional view of the actuating linkage taken along the line and in the direction of the arrows 5—5 of FIG. 3;

FIGS. 6, 7, 8 and 9 are each views representing the disposition of the line bail mechanism in response to motion of the spindle shaft and line spool, with FIGS. 7, 8 and 9 showing the line spool in side elevation, and the spool cap in vertical diametrical section, while FIG. 6 illustrates the line spool and spool cap in vertical diametrical section in order to expose the details of the drag assembly utilized on the apparatus;

FIGS. 10 and 11 are detail elevational views, partially in section, and illustrating the bail opening means utilized in conjunction with the bail actuating means, with FIG. 10 illustrating these components of the structure in normal line retrieval disposition, and with FIG. 11 illustrating these components in the unstable center configuration achieved upon full retraction of the line spool and immediately prior to the bail "flipping" open;

FIG. 12 is a detail elevational view, partially broken away, of the interior of the spool cap, bail hinge, and spindle shaft portions of the structure, with certain portions of the spool cap being cut away to expose the bail actuating means;

FIG. 13 is a detail vertical sectional view taken essentially through the diameter of the spool cap assembly and showing the details of the spool cap along with details of the spindle shaft and line bail;

FIG. 14 is a detail perspective view on an enlarged scale of the actuating lever and bail hinge components of the reel structure of the present invention and illustrating the disposition of the bail hinge as it approaches a tripping dog for moving the bail from open line dispensing disposition to closed line retrieval disposition; and FIG. 15 is a detail exploded perspective view on a slightly enlarged scale showing the details of the tripping dog arrangement utilized to controllably and automatically move the line bail from line dispensing to line retrieving mode on forward rotation of the spool.

DESCRIPTION OF THE PREFERRED EMBODIMENT

With particular attention being directed to FIG. 1 of the drawings, the spinning reel structure generally designated 10 includes a frame structure 11 together with a mounting foot assembly shown at 12, with a mounting post and diverging tang elements. The spool cap is shown at 14, with the line bail being shown at 15, along with the bail hinge 16. A line spool is shown at 17, along with an internally threaded drag nut 18 secured to the outer tip end of the spindle shaft 19 (FIGS. 2 and 8). Crank or handle 20 is provided, along with rotating gripping member 21, with crank 20 passing through a bore formed in main drive shaft 22, which extends into the main drive housing 23. Control handle 24, pivotally secured to frame 11 as at 25, is shown in FIG. 1, with this handle being moved by finger motion in the direction of arrow 27 in order to actuate the bail converting linkage.

In certain spinning reels, an anti-reverse mechanism is sometimes desired, however, the apparatus illustrated here does not incorporate such a mechanism, it being understood that such a linkage would be readily compatible with the structure of the present invention and could be incorporated therein without difficulty.

In FIG. 1, bail 15 is shown in full lines in the line dispensing or casting mode, while the retrieval position is located substantially ninety degrees in a counterclockwise direction as is conventional in reels of this type.

With attention being continued to FIG. 1, but with attention also being directed to FIG. 2, the details of the operational mode of the structure of the present invention will now be described. It will be noted that spool 17, as mounted upon spindle shaft 19, is adapted to move axially in reciprocatory to-and-fro motion between a normal inner and a normal outer winding disposition. Such reciprocatory motion provides for a level fill of line upon spool 17, with this level wind feature being conventional in spinning reels of this type.

With particular attention now being directed to FIG. 2 of the drawings, the main drive shaft 22 is shown provided with a main drive gear 30, which is fixed or otherwise secured to the end of shaft 22. Gear 30 is in mesh with worm 31, worm 31, in turn, being fixed or otherwise secured to the rear portion of spool cap 14. Accordingly, the rotational motion of drive shaft 22 is converted into rotational drive motion in spool cap 14. As is apparent in FIG. 2, worm 31 is in the form of a sleeve, having a bore through the center thereof to accommodate spindle shaft 19. Worm 31 is held in place in frame or housing 11 by a sleeve such as sleeve 32, in a counterbore formed in support bracket 34.

As has been indicated, rotational motion of gear 30, in addition to providing rotational energy for spool cap 14, also provides for reciprocatory motion of spindle shaft 19. This portion of the structure is best illustrated in FIGS. 2 and 3 of the drawings, and attention is accordingly directed to these figures for this explanation. Link arm 35 is secured for pivotal rotation on gear 30 by means of screw element 36, screw element 36 being threadably engaged in gear 30 at a radially eccentric disposition. The degree of eccentricity will determine the amount of throw or reciprocatory thrust in spindle shaft 19. The opposed end of link arm 35 is secured to a second link arm 37, arm 37 being arranged for pivotal rotation about pin 38, pin 38 passing through both arms 35 and 37. The opposed end of arm 37 is pivotally secured to plate 40, which is, in turn, fixed to the inner tip end of spindle shaft 19. Spring member 41 extends between the mid-point of arm 37 to the remote tip of arm 35, thus providing a resilient bias resisting divergence of arms 35 and 37 from the right angular disposition illustrated in FIG. 2. The reason for this structure will be made apparent hereinafter. Arm 37 is secured to plate 40 by means of pin 42, pin 42 extending outwardly from plate 40 for a distance sufficient to provide an abutment surface for lever 44 illustrated in detail in the right hand assembly portion of the exploded view of FIG. 2.

During normal operation, the normal rotation of main drive gear 30 in a clockwise direction, as shown in FIG. 2, will result in axial to-and-fro motion in shaft 19, with one cycle of motion resulting from each complete revolution of drive gear 30.

As has been previously indicated, the axial motion of spindle shaft 19 derived from main drive gear 30 results in axial motion in shaft 19 between a normal inner and a normal outer winding disposition. Actuation of lever 45, in this structure, results in retraction of shaft 19 to a point substantially inwardly of the normal inner winding disposition. With continued attention being directed to FIG. 2, it will be seen that lever 45 of control handle 24 is pivotally secured to frame 11 at pivot point 46, by means of pivot shaft 47. Motion of lever 45 in the direction of arrow 27 results in clockwise motion of lever 44 from the disposition shown in full in FIG. 2 to the disposition illustrated in phantom. Resilient spring member 49 is anchored on pin 50, and extends to a point of attachment with lever 44, thus providing a resilient bias for lever 45.

The disposition of the mechanism during articulation of lever 45 is illustrated in FIGS. 3 and 4. Specifically, FIG. 3 illustrates the normal disposition of arms 35 and 37, while FIG. 4 illustrates the disposition of these arms upon movement of lever 45 in the direction of arrow 27 (FIG. 1). It will be observed that this motion moves arm 37 in a clockwise position about pivot 38, thus retracting spindle shaft 19 to a point beyond the normal inner winding disposition.

The details of the linkage arrangement, particularly of arms 35 and 37, can best be appreciated by a review of the structure shown in FIG. 5. It will be observed that arm 37 has an offset portion, particularly at 52, which is arranged to engage or otherwise rest upon the edge of arm 37. Thus, the angle between arms 35 and 37 is normally held in the form illustrated in FIGS. 2 and 3, with this angle increasing upon motion of lever 44 being transferred to arm 37 by way of pin member 42. The bias available in spring member 41 is sufficient to provide reasonably firm positioning of line spool 17 and spindle shaft 19, and since, in operation, unusual forces are not exerted on the face of spool 19, spring 41 may be of modest strength.

Attention is now directed to FIGS. 6–12 of the drawings, with particular emphasis at this point being directed to FIG. 8. As is apparent in FIG. 8, line spool 17 includes a pair of spaced apart forward and rear flanges, such as the forward flange 60 and rear flange 61, along with a central core 62. Rear flange 61 includes a line abutting surface 63, a peripheral surface 64 grooved to accommodate cork gasket member 65, along with an inner groove as at 66 to accommodate clicker pick element 67, with element 67 being best illustrated in FIG. 12. Rear flanges 61 has a rear abutment face as at 68 for engaging the various components of the line bail mechanism to be described more fully hereinafter.

With attention being directed to FIG. 12, line bail 15 along with bail hinge 16 is mounted upon spool cap 14, particularly about pivot shaft 70. Pivot shaft 70 is firmly fixed in the shroud portion 71 of spool cap 14. Bail hinge 16 has a pair of pins 72 and 73 secured thereto, these pins being disposed radially outwardly from the axis of pivot shaft 70. Pins 72 and 73 are provided with shank portions which extend radially inwardly of the inner peripheral surface of the spool cap shroud 71, particularly as is shown at 74 and 75 respectively. These inwardly extending portions 74 and 75 are arranged to make contact with the abutment surface 68 of spool flange 61 upon movement of spool 17 and spindle shaft 19 inwardly from the normal inner line retrieving disposition.

With particular attention now being directed to FIGS. 10 and 11 of the drawings, it will be observed that pins 72 and 73 are arranged to pass through shroud surface 71 in arcuate slots 76 and 77 respectively. These slots are provided with terminal portions 76a, 76b, and 77a and 77b respectively. Accordingly, slotted areas 76 and 77 provide limits toward arcuate rotation of bail hinge 16.

With attention now being re-directed to FIGS. 6—9 wherein the over center bias means for the structure is illustrated. The over center bias means includes an arm 78 having a claw element 79 formed in one end thereof, with the opposed or opposite end having a spring receiving slot area 80 formed therein. Claw 79 is arranged to be received within slot 82 (FIG. 12), with the individual claw elements 79a and 79b being spread sufficiently so as to permit rocking motion to occur in arm 78 about its mounting point adjacent claw 79 in slot 82.

With continued attention being specifically directed to FIGS. 6 and 7, it will be observed that the inward travel of spool 17 with spindle shaft 19, as shown in arrows 81—81 (FIG. 7) abutment surface 68 makes contact with inwardly extended portion 75 of pin 73, and thereby rocks bail hinge 16 accordingly until the disposition illustrated in FIG. 7 is reached. It will be observed that at this point in progress, elements 74 and 75 are in contact with abutment surface 68, as is tip portion 78a of member 78. Mechanical bias is provided by spring 84, which extends between member 78 and the tip portion 75 of pin 73.

With continued attention being directed to FIG. 7, it will be observed that the rearward travel of member 78 provides an over center bias on member 73, by virtue of inward tilting of member 78. This shift is responsible for the flipping action occuring in FIG. 8, wherein the over center mechanism carries bail hinge to a point adjacent abutment surfaces formed in slotted ares 76 and 77 described hereinabove. Thus, as line spool 17 moves outwardly in accordance with the arrow 85, bail hinge 16 moves in a counter-clockwise direction, as shown in FIG. 8, until the disposition is reached with pins 72 and 73 disposed adjacent end portions 76a and 77b respectively of slots 76 and 77. Continued forward motion of line spool 17, as shown in FIG. 9, and as illustrated by arrow 86, provides the disposition therein shown.

In the event the user desires to place the bail in an intermediate line "interferring" disposition, lever 45 is again moved along the direction of arrow 27 (FIG. 1) and line spool 17 will retract pursuant to the views shown and in the sequence of views shown in FIGS. 9, 8 and 7. The spool 17 bottoms against post 88 in the position shown in FIG. 7 and release of lever 45 will result in motion described in and in the sequence shown of FIGS. 7, 8 and 9. Post 88 serves an additional function to be described later.

In order to control and adjust the drag on the system, line spool 17 is arranged to be controllably rotated about spindle shaft 19. As best illustrated in FIG. 8, drag adjusting knob 18 has a pair of abutment surfaces, including an inner abutment surface 90 and an outer annular abutment surface 91. The inner abutment surface 90 makes contact with the drag components disposed axially inwardly thereof, while surface 91 is arranged to make frictional contact with the mating surface 92 of line spool 17. The drag mechanism includes a pair of washers 94 and 95 which, in turn, mate with a counterbore step area 96 of line spool 17, along with a stack of alternately disposed metal and molded polytetrafluoroethylene washers which are disposed inwardly of washer 95, as shown generally at 97. The metal washers are provided with radially extending ears which are received in axially extending slots formed outwardly of the bore formed in the core 62 of line spool 17. The base of core 62 of spool 17 seats against serrated seating element 98, seating element 98 being fast upon shaft 19. The outer serrations 99 of seat 98 are arranged to mate with the free tip end of clicker pick 67, and audibly indicate relative motion between spindle shaft 19 and line spool 17. As is illustrated in FIG. 8 and also FIG. 12, clicker pick element 67 rests in an annular slot formed in the rear surface of line spool 17.

Attention is now directed to FIG. 14 and 15, which illustrate the action of the automatic closing feature for the bail 15. As is shown in FIG. 14, bail hinge element 16 has an ear portion 101 extending radially outwardly from pivot pin 70, ear portion 101 being arranged to make camming contact with camming dog 102 which is pivotally secured to frame 11 in the manner illustrated. Camming dog 102 is adapted and arranged to move arcuately within the area defined by slotted zone 104, flanked by abutments 105 and 106, with spring bias being applied by virtue of spring member 107. Spring 107 has its clevis 108 received within bore 109 formed in frame 11, with the opposite end having clevis 110 received within slotted zone 111 of camming dog 102. The camming dog assembly is secured or attached to frame 11 by screw 112. In operation, when bail 15 is in the open position, and rotation of the spool cap is started by forward rotation of crank 20, ear portion 101 makes contact with camming dog 102, as illustrated in FIG. 14, thus causing bail 15 to shift to its stable closed line retrieving disposition. Line is accordingly captured and reeled upon spool 17 over line guide 15a or bail 15. When in closed or line retrieval disposition, contact is not made between ear 101 and camming dog 102. Also, when spool cap 14 is rotated in the reverse direction from that required for line retrieval, and when bail 15 is in open or line dispensing disposition, camming dog 102 is free to rotate arcuately in the direction of the arrow 114, and thereby permit bail 15 to remain in open disposition.

Reference is made to FIG. 12 of the drawings wherein the post 88 is clearly illustrated. This component, in addition to providing a bottoming post, performs two additional functions as well. Post 88 is weighted so as to provide dynamic balance in the system, and to act as a counterweight for those various components secured or otherwise attached to the bail hinge. In addition, the positioning of post 88 is such that side-thrust on the axis of the shaft is avoided. Whenever the user actuates arm 45 of lever 24, the spool cap 14 retracts smoothly on spindle shaft 19 until contact is made with shank portions 74 and 75 of pins 72 and 73. The height of post 88 will be matched to provide a three-point rest for the base of spool 17, thereby avoiding cocking of the spool on the shaft. Post 88 may be die-cast directly into the spool cap, or may, alternatively, be in the form of a self-tapping screw or the like.

As has been indicated, bail 15 has a reverse bend formed therein, at a point immediately adjacent line roller sleeve guide 15a. It is this reverse bend which accomplishes the gripping contact between the line and the bail surface. As the bail is opened, that is, moves from the position shown in FIG. 6 to that of FIG. 8, and also shown in FIG. 1, that portion or segment of the fishing line making contact with the bail is simply moved from guide 15a outwardly to the reverse bend area. This transfer of contact point is achieved without modifying or otherwise changing the disposition of the line as it leaves the spool, and thus the position of a lure secured to the end of the line at a point beyond the tip of the rod is not altered.

I claim:

1. A spinning reel structure of the open-face type comprising, in combination, frame means, a spindle shaft operatively coupled to said frame means, a line spool assembly including a line spool mounted on said spindle shaft and a spool cap means having a generally open end and being mounted for rotation upon said frame means and having cylindrical shroud means disposed radially outwardly of said spool shaft enclosing at least a portion of said line spool assembly, line bail means secured to said spool cap, and drive means mounted on said frame means including main drive gear means for rotating said spool cap and linkage means for reciprocatorily moving said spindle shaft along the axis of said spool cap;

a. said spindle shaft having means for receiving said line spool thereon, and being received in said frame means and being coupled to said linkage means arranged to move said spindle shaft axially in reciprocatory to-and-fro motion between a normal inner and a normal outer winding disposition in response to motion of said main drive gear means, said linkage means including means normally biasing said spindle shaft outwardly and in a direction toward the open end of said spool cap;

b. said line spool mounted on said spindle shaft with said line spool including spaced apart forward and rear flanges, said rear flange being normally confined within said spool cap shroud means and having an outer periphery disposed outwardly of said spindle shaft and in spaced relation to the inner peripheral surface of said spool cap shroud means;

c. said line bail means being mounted on said spool cap and arranged for rotation therewith, said line bail means having an over center biasing means defining an unstable central neutral disposition and a pair of stable extended dispositions including a stable line retrieving disposition and a stable line dispensing disposition, said line bail means comprising a line engaging intermediate segment with spool cap mounting segments disposed at each end thereof, one of said spool cap mounting segments including a pivotally mounted bail hinge secured at one end to said cylindrical shroud with said hinge having a pivot shaft receiving portion and being arranged for pivotal motion about said shaft;

d. said pivot shaft being secured to said spool cap shroud and being operatively coupled to said bail hinge, pin means secured to said bail hinge and being disposed radially outwardly from the axis of said pivot shaft and having shank portions extending radially inwardly of the outer periphery of said rear spool flange;

e. means operatively engageable with said spindle shaft linkage means for controllably moving said spindle shaft axially inwardly of said normal inner winding disposition against said spindle shaft biasing means to a second retracted disposition to bring said rear flange into contact with said pin means;

f. said over center bias means being coupled to said pin means and arranged to bring said line bail means into stable line dispensing disposition from said line retrieving disposition upon substantially full retraction of said line spool into said second retracted disposition.

2. The spinning reel structure as defined in claim 1 being particularly characterized in that generally arcuate slots are formed within said spool cap for receiving said pin means.

3. The spinning reel structure as defined in claim 2 being particularly characterized in that the end of said arcuate slots provide abutment surfaces for the shank portions of said pin means.

4. The spinning reel structure of claim 2 wherein the inner ends of said arcuate slots are each at an axial disposition inwardly of said rear flange in said second retracted disposition.

5. The spinning reel structure of claim 2 being particularly characterized in that a pair of pin means are provided.

6. The spinning reel structure of claim 5 being particularly characterized in that said pin means are arranged in diametrically opposed relationship from said pivot means.

7. The spinning reel structure of claim 6 being particularly characterized in that said bail arm is moved to a generally central disposition forward of said shroud and generally transverse to said spindle shaft when said pins are in equal axial disposition.

8. The spinning reel structure of claim 5 being particularly characterized in that the neutral disposition of said bail means is shifted toward the line dispensing disposition when said pins are at equal axial dispositions.

9. The spinning reel structure of claim 1 being particularly characterized in that said bail means has a line roller sleeve adjacent said bail hinge.

10. The spinning reel structure as defined in claim 1 being particularly characterized in that said over center biasing means including second linkage means having arm means rockably secured adjacent a first end to said spool cap and having a portion remote from said first end arranged to contact the rear flange of said line spool when said line spool is disposed inwardly of said normal inner winding disposition and in said second retracted disposition, said arm means having a resilient member coupled to the shank portion of one of said pin means and providing a means for shifting said neutral disposition toward said stable line dispensing disposition.

11. The spinning reel structure of claim 10 being particularly characterized in that the arms means of said over center biasing means is moved inwardly in response to movement of said spindle shaft from said normal dispositions to said second retracted disposition and wherein said neutral point is shifted toward said line dispensing disposition when in said second retracted disposition.

12. The spinning reel structure as defined in claim 10 being particularly characterized in that generally arcuate slots are formed within said spool cap for receiving said pin means.

13. The spinning reel structure of claim 1 being particularly characterized in that said bail hinge has an ear portion extending radially outwardly from said pivot shaft, and said frame means has a camming dog mounted thereon and extending forwardly thereof, said camming dog being arranged to make camming contact with said ear portion for closure of said bail to line retrieval disposition upon forward rotation of said spool cap.

14. The spinning reel structure of claim 13 being particularly characterized in that said camming dog is pivotally mounted onto said frame means and has spring bias means normally urging said dog forwardly into contact with said ear portion.

* * * * *